No. 625,361. Patented May 23, 1899.
D. R. SHEEN.
AUTOMATIC STOCK FOUNTAIN.
(Application filed July 25, 1898.)
(No Model.)

WITNESSES.

INVENTOR
Daniel R. Sheen
By L. M. Thurlow
Atty.

THE NORRIS PETERS CO., PHOTO-LITHO., WASHINGTON, D. C.

UNITED STATES PATENT OFFICE.

DANIEL R. SHEEN, OF PEORIA, ILLINOIS.

AUTOMATIC STOCK-FOUNTAIN.

SPECIFICATION forming part of Letters Patent No. 625,361, dated May 23, 1899.

Application filed July 25, 1898. Serial No. 686,769. (No model.)

*To all whom it may concern:*

Be it known that I, DANIEL R. SHEEN, a citizen of the United States, residing at Peoria, in the county of Peoria and State of Illinois, have invented certain new and useful Improvements in Automatic Stock-Fountains; and I do hereby declare that the following is a full, clear, and exact description of the invention, which will enable others skilled in the art to which it appertains to make and use the same.

This invention relates to devices for watering stock.

The object of the invention is to provide means for keeping a watering-trough continually supplied with water.

A further object of the invention is to keep water in the trough as near a fixed height as possible.

In the annexed drawings the device is clearly shown.

Figure 1:
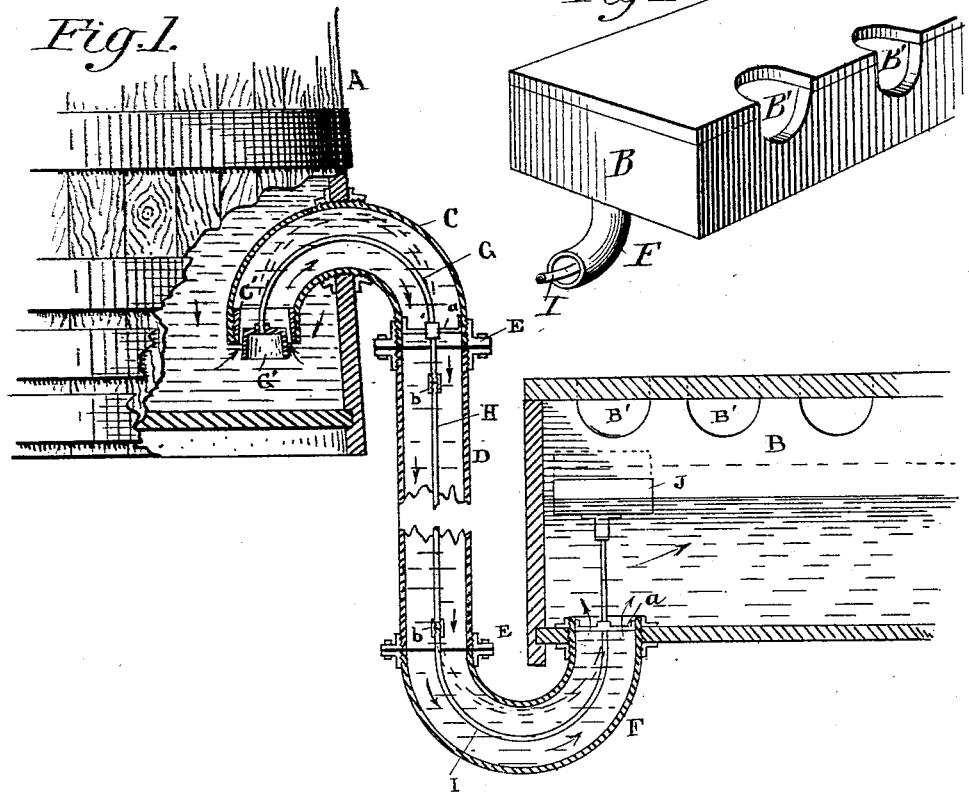
Figure 1A:
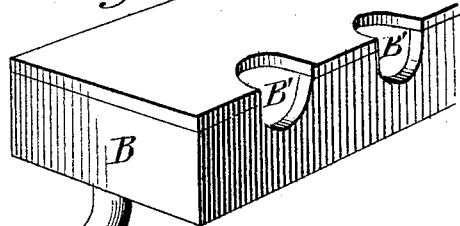
Figure 2:
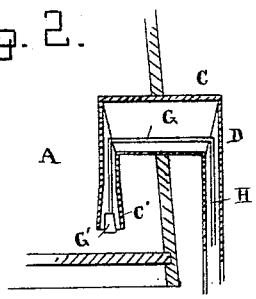
Figure 3:
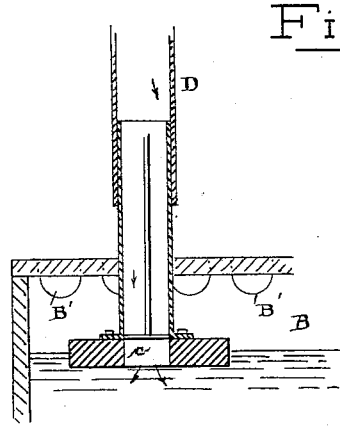

Figure 1 is a sectional elevation of the device, showing it in its entirety. Fig. 1ª is a perspective view of a portion of the trough, showing drinking-openings therein. Fig. 2 is a sectional elevation of a modified form of the conducting-pipe within the supply-reservoir. Fig. 3 is a sectional elevation of a portion of float and conducting supply-pipe, showing a sliding or adjusting pipe for conveying water to the trough.

A is the supply tank or reservoir, and B a trough supplied from such tank. An opening is made in the side of the tank A and a gooseneck C inserted with its open end down, and within the open end is secured a tapered valve-seat C', with its larger end hanging lowest. To the outer end of the gooseneck is attached a vertical pipe D by clamps E, and at the lower end of said pipe is attached a similar gooseneck F, whose free end is upturned and secured to the bottom of the trough and into which it opens. Within the conducting-pipe so constructed is an S-shaped valve-stem consisting of the parts G H I, kept in place by the guides *a a*. Coupling-sleeves *b b* serve to keep the parts rigidly connected. On the upper end of the valve-stem, within the tank A, is a valve or plug G', which when seated makes a water-tight joint. The lower upturned end of the stem within the trough carries a float J. The dotted lines show the closed position of the valve, as well as the highest level of water in the trough. In the position shown water is being admitted to the trough, the float rising as the water enters, gradually stopping the flow.

The device may be so regulated, the supply-pipe being sufficiently large, that the amount of water flowing from the tank A will equal the amount being withdrawn from the trough. This of course cannot be true at all times; but ordinarily this result will obtain when the withdrawal from the said trough is not too sudden or too large in volume.

The form in Fig. 2 merely shows how the pipe may be constructed to permit a large vertical movement of the valve-stem when the valves and their seats are of an unusually long taper.

Fig. 3 is an attachment which may be used on the arrangment shown in Fig. 1 instead of the gooseneck F. This device allows the water to enter the trough from above, being accomplished by providing a float cut through at *c* and a section of pipe secured to the float above the opening and snugly fitting the pipe above, but sliding freely therein. The valve-stem is also attached to the float, so that the valve is manipulated as in the first form.

My arrangement is simpler, cheaper, and more effective than any device of this class that I am aware of.

A point of great superiority of my device over any other is the use of the rigid valve-stem. The operation is not dependent upon any levers or pivots of any kind. The stem may be adjusted for any length by the connecting-sleeves *b b*. The trough is provided with a cover, and in the angle formed by this portion and in the side of the trough are openings B' for the stock to drink through. This is more for the use of smaller stock and keeps hogs from getting into the water. By such an arrangement as I have described and shown throughout the water is always clean and fresh and an abundance is always ready.

The arrangement of parts may be altered as found expedient without departing from the spirit of the invention.

Having thus described my invention, what I claim as new, and desire to secure by Letters Patent, is—

1. In an automatic stock-fountain, a supply-tank, a trough at a lower level than that of the tank, a conducting-pipe connecting said tank and trough, a valve-seat in the upper downturned end of said pipe, a rigid valve-stem within the pipe, a float rigidly secured to the lower end of the valve-stem, a valve rigidly secured to the upper end of valve-stem all for the purposes set forth and described.

2. In an automatic stock-fountain the combination of the supply-tank A, the trough B, the gooseneck C opening into said tank A, the gooseneck F opening into the trough B, the connecting-pipe D between the goosenecks, a valve-stem within the pipe, a float on the lower end thereof within the trough, a valve-seat within the mouth of the gooseneck C, a valve seated therein and secured to the said stem for the purposes set forth.

3. In an automatic stock-fountain, the tank A and the trough B in combination with the supply-pipe, a gooseneck at the upper end thereof with its mouth within the said tank, a gooseneck at the lower end of said pipe and opened into the said trough, an adjustable valve-stem within the pipe and goosenecks, a valve on the upper end of the stem and a float on its lower end substantially as set forth.

4. In a device for watering stock a supply-tank, a gooseneck entering the side thereof and having the end within the tank opening downward, a trough below the tank, a gooseneck entering the bottom thereof with its end upturned, a conducting-pipe connecting the goosenecks in combination with a valve-stem within the pipe and goosenecks, guides within the pipes and goosenecks for supporting the stem, a valve on the upper end of said stem within the tank, a float on the lower end thereof within the trough and openings in the side and top of the trough substantially as shown.

5. In an automatic stock-fountain, the combination of a supply-tank, a trough below the tank, a supply-pipe for connecting the two, a valve-stem within the pipe, a valve on the upper end thereof, a float at the lower end within the trough, an opening through the float, a pipe secured to the float over the opening, said pipe adapted to slide within the said supply-pipe substantially as set forth and described.

In testimony whereof I affix my signature in presence of two witnesses.

DANIEL R. SHEEN.

Witnesses:
  CARL G. NELSON,
  E. G. PLECKER.